United States Patent [19]

Weir

[11] 4,108,472
[45] Aug. 22, 1978

[54] FOLD BACK LANDING GEAR LEG

[75] Inventor: Gary L. Weir, Denton, Tex.

[73] Assignee: Pullman Incorporated, Chicago, Ill.

[21] Appl. No.: 791,107

[22] Filed: Apr. 26, 1977

[51] Int. Cl. .................................................. B60s 9/02
[52] U.S. Cl. .................................... 280/763; 280/764
[58] Field of Search ............................. 280/763, 764;
248/188.6, 439; 108/131, 132, 130

[56] References Cited

U.S. PATENT DOCUMENTS

| 1,868,021 | 7/1932 | Nabors | 280/763 |
| 1,868,971 | 7/1932 | Davis | 280/764 |
| 2,969,249 | 1/1961 | Fox | 108/131 |

Primary Examiner—Robert R. Song
Attorney, Agent, or Firm—Thomas G. Anderson

[57] ABSTRACT

A fold back landing gear in a trailer underframe including a pair of downwardly depending legs hinged to the underframe and selectively held in a vertical trailer supporting position and an essentially horizontal stowed position nestled within the trailer underframe by a longitudinally extending strut reciprocably carried within a clevis-like bracket depending from the trailer underframe and to which the strut may be affixed to secure the gear legs in their respective vertical and stowed positions.

4 Claims, 4 Drawing Figures

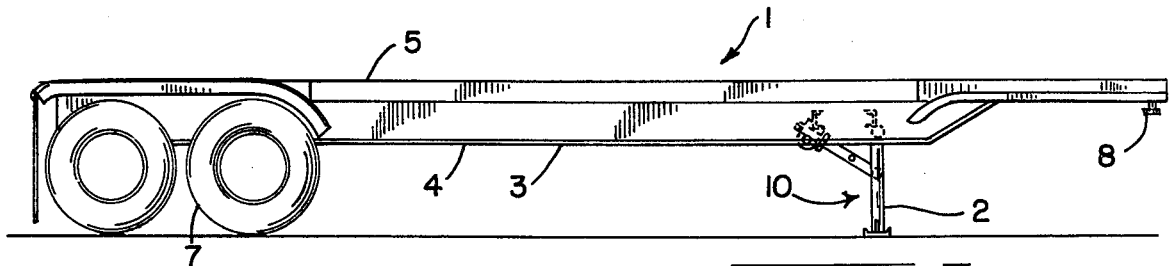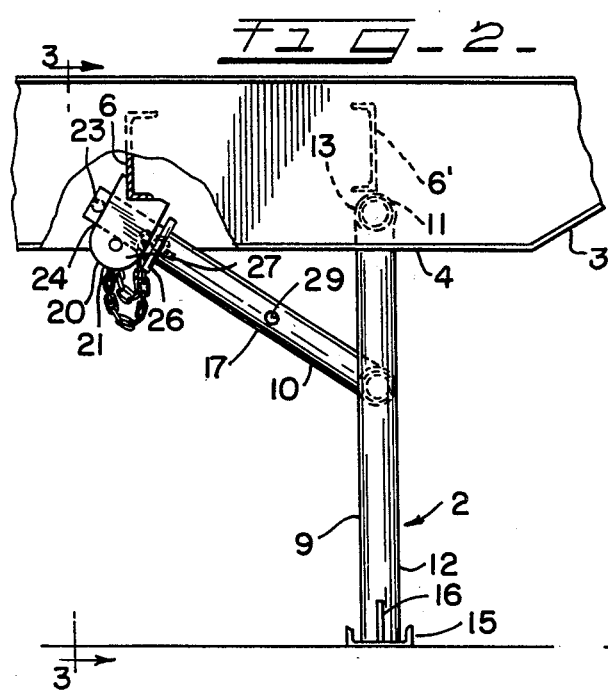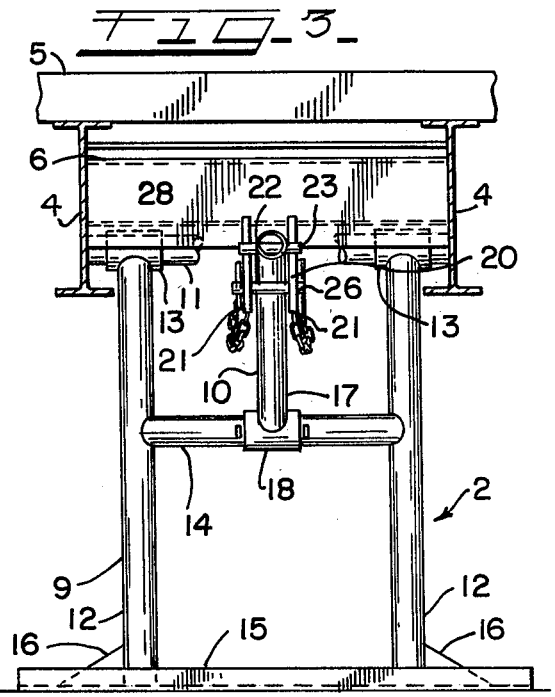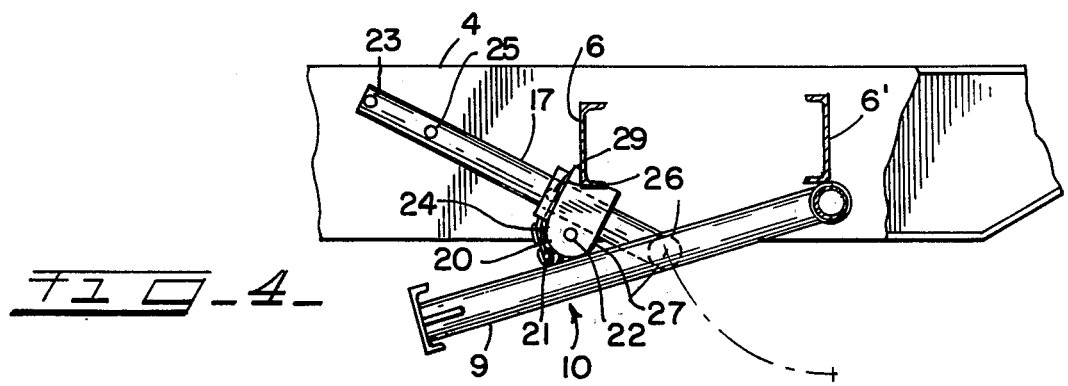

FOLD BACK LANDING GEAR LEG

BACKGROUND OF THE INVENTION

1. Field of the Invention

The present invention relates to highway vehicles and in particular to trailer landing gear constructions.

2. Description of the Prior Art

The prior art landing gear constructions are exemplified by U.S. Pat. Nos. 3,104,891; 3,236,501 and 3,448,988. U.S. Pat. No. 3,104,891 shows a landing gear leg secured by a rigid diagonal brace, U.S. Pat. No. 3,236,501 shows a landing gear having a foldable diagonal leg brace, and U.S. Pat. No. 3,448,998 shows a landing gear construction including a rigid gear leg bracing member pivotally secured to an associated gear leg and coupled to the trailer underframe by a removable pin.

SUMMARY OF THE INVENTION

The present invention pertains to an improved landing gear for a highway trailer. The landing gear includes an H-shaped gear leg assembly pivoted from a transverse bar or brace extending between longitudinally extending side members of the underframe and a diagonal leg bracing member or strut secured to the underframe through a clevis-like bracket depending from the trailer underframe. The invention also provides for local stiffeners in the underframe in the proximaty of the landing gear to assure vertical alignment of the landing gear when it is moved to the lowered position and thus effectively prevent the imposition of destructive bending loads on the gear legs due to relative twisting or bulging of the side members when the trailer is loaded with a very heavy cargo.

BRIEF DESCRIPTION OF THE DRAWINGS

FIG. 1 is a side elevational view of a highway trailer having a landing gear embodying the present invention;

FIG. 2 is an enlarged side elevational view of the landing gear shown in FIG. 1;

FIG. 3 is a cross-sectional view taken along line 3—3 in FIG. 2; and

FIG. 4 is an enlarged side elevational view showing the landing gear in the raised or stored position.

DESCRIPTION OF THE PREFERRED EMBODIMENT

The trailer 1 includes an underframe 3 having a pair of longitudinally extending side frame members 4 supporting a flat deck or bed 5 and local underframe stiffeners or transverse channel members 6 and 6' vertically proximate to the landing gear 2 and welded to each of the I-beam shaped side members 4. The aft end of the underframe 3 is carried on a tandem rear running gear construction 7 and is provided at its forward end with a kingpin 8 or the like adapted to fit into a conventional fifth wheel (not shown). It should be noted that the trailer may be of unusual length and high strength construction for transporting oversize or extremely large and heavy objects (e.g., well rigging and pumping equipment, municiple and industrial electrical generators and transformers, mining equipment etc.).

The landing gear 2 is of an essentially tubular welded construction and includes an H-shaped gear leg assembly 9 hingedly depending from the underframe 3 and securable in a vertical trailer supporting position by the diagonal leg brace assembly 10. The gear leg assembly 9 includes a transverse pivot beam or bar 11 extending between and welded to the side members 4, a pair of vertical gear legs 12 coupled to the transverse beam 11, a transverse intermediate bracing member 14 interconnecting the vertical legs 12, a lower channel or foot 15 welded to the bottoms of the legs 12, and a pair of gusset plates 16, each welded to one of the legs 12 and the lower channel or foot 15 to rigidify the welded connections between the legs 12 and channel 15 and thus assure uniform distribution of trailer loads therebetween.

The leg brace or strut assembly 10 is adapted to reinforce and brace the leg assembly 9 in the vertical trailer supporting position as shown in FIGS. 1-3 as well as retain it in the raised position as illustrated in FIG. 4. The diagonal brace assembly 10 includes a diagonal brace 17 hingedly coupled to the intermediate bracing member 14 through a sleeve member 18 welded to the lower end of the brace 17. The sleeve 18 is rotatably carried on the intermediate bracing member 14 and is retained and centered between the lugs 19 which prevent shifting lateral movement of the sleeve 18 on the bracing member 14. The upper end of the diagonal brace 17 is coupled to the trailer underframe and in particular to the aft transverse channel member 6 by the locking bracket structure 20. Specifically, a pair of depending transversely spaced plates 21 are welded to the channel 6 which are coupled at their lower ends by the supporting pin 22 to form an opening entraining the diagonal bracing member 17. As can be seen from the drawings, the upper end of the bracing member 17 includes a pair of laterally extending lugs or ears 23 which engage the rear edges 24 or the plates 21 to restrain and arrest forward sliding of the brace 17 and thus forward rotation of the gear legs 12 beyond the vertical trailer supporting position; and, holes or appertures 25 adapted to receive the T-shaped locking pin 26 such that the pin 26 engages the forward edges 27 of the plates 21 to prevent rearward movement of the brace 17 and thus the legs 12. Additionally, it should be noted that a removable cotter pin 28 or the like is provided to assure that the pin 26 is not inadvertently dislodged. To move the landing gear to the raised and stored position, the pin 26 can be withdrawn from the brace 17 and the gear legs 12 rotated rearwardly which in turn moves the brace 17 between the plates 21 rearward until the intermediate holes or apertures 29 provided therein are positioned behind the rear edges 24 of the plates. Thereafter, the pin 26 can be inserted through the holes 29 to retain the gear legs in the raised and stored position.

From the above it can be seen that the present invention contemplates a novel lightweight landing gear structure which is relatively easy to manufacture and simple to operate and maintain. Additionally, because the present construction utilizes local underframe stiffeners (i.e., the channel members 6 and 6') which prevent bulging or end-to end twisting of the side members 4 when the trailer is loaded with a very heavy cargo, proper vertical alignment of the gear legs is assured, thus preventing the imposition of bending loads on the gear legs 12 which could result if the lowered gear were angularly askew. Similarly, the use of the single channel or foot 15 to rigidly interconnect the lower ends of the gear legs as well as to distributively transfer trailer loads to the ground, equalizes the loads carried by each gear leg to further enhance the structural integrity of the landing gear.

The foregoing description and drawings merely explain and illustrate the invention and the invention is not limited thereto, except insofar as the appended claims are so limited, as those skilled in the art who have the disclosure before them will be able to make modifications and variations therein without departing from the scope of the invention.

What is claimed is:

1. In a trailer underframe having a pair of laterally spaced longitudinally extending side rails and a pair of longitudinally spaced crossmembers extending therebetween, the improvement comprising a folding landing gear, including:

a pair of downwardly depending legs having intermediate and lower bracing members extending therebetween, hinge means proximate one of said crossmembers coupling the upper ends of the legs to the side members and accommodating movement of the legs between a vertical trailer supporting position to an essentially horizontal stowed position nestled within the trailer underframe, bracket means depending from the second of said crossmembers intermediate the side rails, a longitudinally extending leg rigidifying strut having a lower end portion hingedly secured to said intermediate bracing member and an upper end portion reciprocably carried within said bracket means, said bracket means including a pair of laterally spaced plates forming a depending clevis-like carrier for said strut and the upper portion of said strut being received therethrough, and locking means on said strut operatively associated with said bracket means to selectively secure the gear legs in their respective vertical and stowed positions.

2. The invention according to claim 1, and said hinge means including a pivot beam extending between said side rails having sleeves journeled thereon coupling the upper portions of the gear legs to the beam.

3. The invention according to claim 1, and said lower bracing member being a horizontal beam forming a sand shoe for the gear legs extending substantially the width of the trailer.

4. The invention according to claim 1, and said locking means being axially spaced apertures in said strut and pin means selectively engageable therewithin having end ear portions abutting respective edges of the plates to arrest reciprocable movement of the strut.

* * * * *